US008111149B2

(12) United States Patent
Potkonjak

(10) Patent No.: US 8,111,149 B2
(45) Date of Patent: Feb. 7, 2012

(54) MEASUREMENT-BASED WIRELESS DEVICE SYSTEM LEVEL MANAGEMENT

(75) Inventor: Miodrag Potkonjak, Los Angeles, CA (US)

(73) Assignee: Empire Technology Development LLC, Wilmington, DE (US)

( * ) Notice: Subject to any disclaimer, the term of this patent is extended or adjusted under 35 U.S.C. 154(b) by 464 days.

(21) Appl. No.: 12/433,696

(22) Filed: Apr. 30, 2009

(65) Prior Publication Data

US 2010/0277308 A1 Nov. 4, 2010

(51) Int. Cl.
*G08B 1/08* (2006.01)
*H04Q 7/00* (2006.01)
*H04B 17/00* (2006.01)

(52) U.S. Cl. ......... 340/539.11; 430/539.16; 430/539.17; 430/286.02; 370/332; 370/338; 455/67.11

(58) Field of Classification Search ............... 340/539.1, 340/539.11, 539.16, 539.17, 539.19, 539.21, 340/286.01, 286.02; 370/332, 338, 345; 455/67.11, 456.1
See application file for complete search history.

(56) References Cited

U.S. PATENT DOCUMENTS 6,757,543 B2 * 6/2004 Moran et al. ............... 455/456.1
6,944,144 B2 * 9/2005 Guo et al. ..................... 370/332
7,092,405 B2 * 8/2006 Guo et al. ..................... 370/468
7,499,432 B2 * 3/2009 Guo et al. ..................... 370/332
7,899,403 B2 * 3/2011 Aaron ........................ 455/67.11
2004/0185786 A1 9/2004 Mirbaha et al.
2005/0154534 A1 7/2005 Haaland et al.
2008/0008188 A1 1/2008 Buga et al.
2008/0228908 A1 9/2008 Link et al.
2009/0067372 A1 3/2009 Shah et al.
2010/0118733 A1 * 5/2010 Wu et al. ....................... 370/254

OTHER PUBLICATIONS

International Search Report and Written Opinion, issued in International Application No. PCT/US2010/032994, mailed Sep. 9, 2010, 8 pages.
Cerpa et al., “Statistical Model of Lossy Links in Wireless Sensor Networks,” Proceedings of the Fourth International Symposium on Information Processing in Sensor Networks, Apr. 2005, pp. 81-88.
Cerpa et al., “Temporal Properties of Low Power Wireless Links: Modeling and Implications on Multi-Hop Routing,” Sixth ACM International Symposium on Mobile Ad Hoc Networking and Computing, May 5005, pp. 414-425.
Feng et al., “Location Discover using Data-Driven Statistical Error Modeling,” 25th Conference on Computer Communications, Apr. 2006, 14 pages
Hong et al., “Power Optimization of Variable-Voltage Core-Based Systems,” IEEE Transactions on Computer-Aided Design of Integrated Circuits and Systems, Dec. 1999, vol. 18, No. 12, pp. 1702-1714.

(Continued)

*Primary Examiner* — Van T. Trieu
(74) *Attorney, Agent, or Firm* — Schwabe, Williamson & Wyatt, P.C.

(57) ABSTRACT

A method and apparatus for system level management to a wireless device using measurements. In various embodiments, a system level manager independent of the operating system of a wireless device may be configured to determine relevant metrics to obtain measurements, based at least in part on the quality of service needs and performance/resource consumption models of the wireless device. In various embodiments, the system level manager may be further configured to determine management actions to be taken by the operating system based at least in part on the measurements obtained.

29 Claims, 7 Drawing Sheets

OTHER PUBLICATIONS

Kirovski et al., "Engineering Change Protocols for Behavioral and System Synthesis," IEEE Transactions on Computer-Aided Design of Integrated Circuits and Systems, Aug. 2005, vol. 24, No. 8, pp. 1145-1155.
Moshnyaga et al., "Handheld System Energy Reduction by OS-Driven Refresh," International Workshop on Power and Timing Modeling, Optimization and Simulation, Sep. 2006, pp. 24-35.
Nahapetian et al., "Optimization for Real-Time Systems with Non-convex Power Versus Speed Models," International Workshop on Power and Timing Modeling, Optimization and Simulation, Sep. 2007, pp. 443-452.
Plackett et al., "The Design of Optimum Multifactorial Experiments," Biometrika, Jun. 1946, vol. 33, pp. 305-325.
Shamsi et al., "Challenging Benchmark for Location Discovery in Ad Hoc Networks: Foundations and Applications," ACM International Symposium on Mobile Ad Hoc Networking and Computing, May 2008, pp. 361-370.
Wong et al., "Power Minimization in QoS Sensitive Systems," IEEE Transactions on Very Large Scale Integration (VSLI) Systems, Jun. 2004, vol. 12, No. 6, pp. 553-561.
Yi et al., "A Statistically Rigorous Approach for Improving Simulation Methodology," Proceedings of the Ninth International Symposium on High-Performance Computer Architecture, Feb. 2003, 11 pages.

* cited by examiner

700 A computer program product

732 Computer Readable Storage Medium

734 Programming instructions configured to perform at least one of:

receiving goals or quality of service requirements of a wireless device;
    receiving performance or resource consumption models of a wireless device;
    determining a number of metrics to measure;
    obtain measurements for determined metrics;
    determine a number of management actions based on obtained measurement of determined metrics; and/or
    conveying or performing the determined management actions

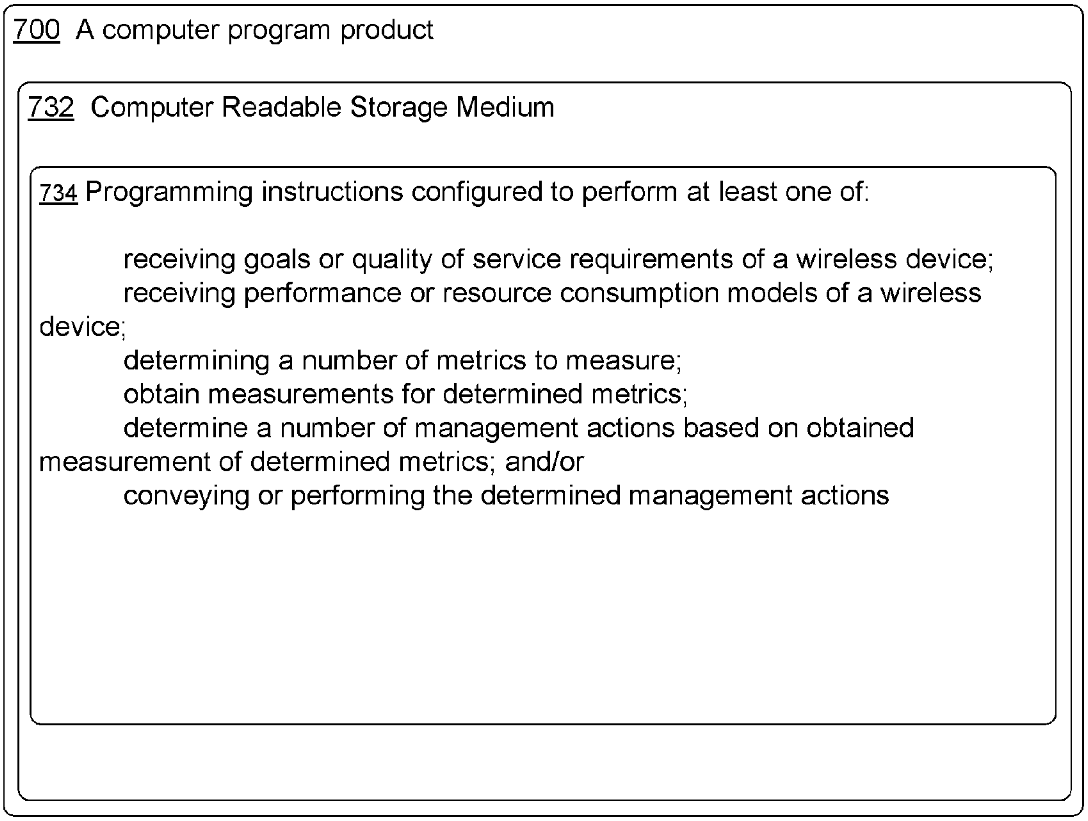

Figure 7

MEASUREMENT-BASED WIRELESS DEVICE SYSTEM LEVEL MANAGEMENT

BACKGROUND

Wireless communication networks are becoming increasingly popular. A wireless network may include plurality of wireless devices. The next generation wireless devices are expected to be highly complex, providing ultra wide bandwidth, but may include high power budget wireless radios such as MIMO, cognitive, and/or ultra wide bandwidth transceivers. At the same time, many wireless devices are increasingly configured with a variety of sensors such as camera, camcorder, GPS, compass, and thermometers. It is expected that the wireless devices may soon start to communicate with human body embedded devices such pacemakers, portable kidneys and so forth. Wireless devices may employ operating systems that are not customized to the needs and preference of their users, environment and specific characteristics of the device, available resources, likely applications and workload, and so forth. Such approaches to the operation and management wireless devices may no longer be viable for the next generation of wireless devices. Further, the optimization of such systems using design and operating system developers may be inefficient.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 7 illustrates an example article of manufacture having a computer program product for system level management using measurement in accordance with various embodiments, all arranged in accordance with the present disclosure.

DETAILED DESCRIPTION OF EMBODIMENTS OF THE DISCLOSURE

Figure 1:
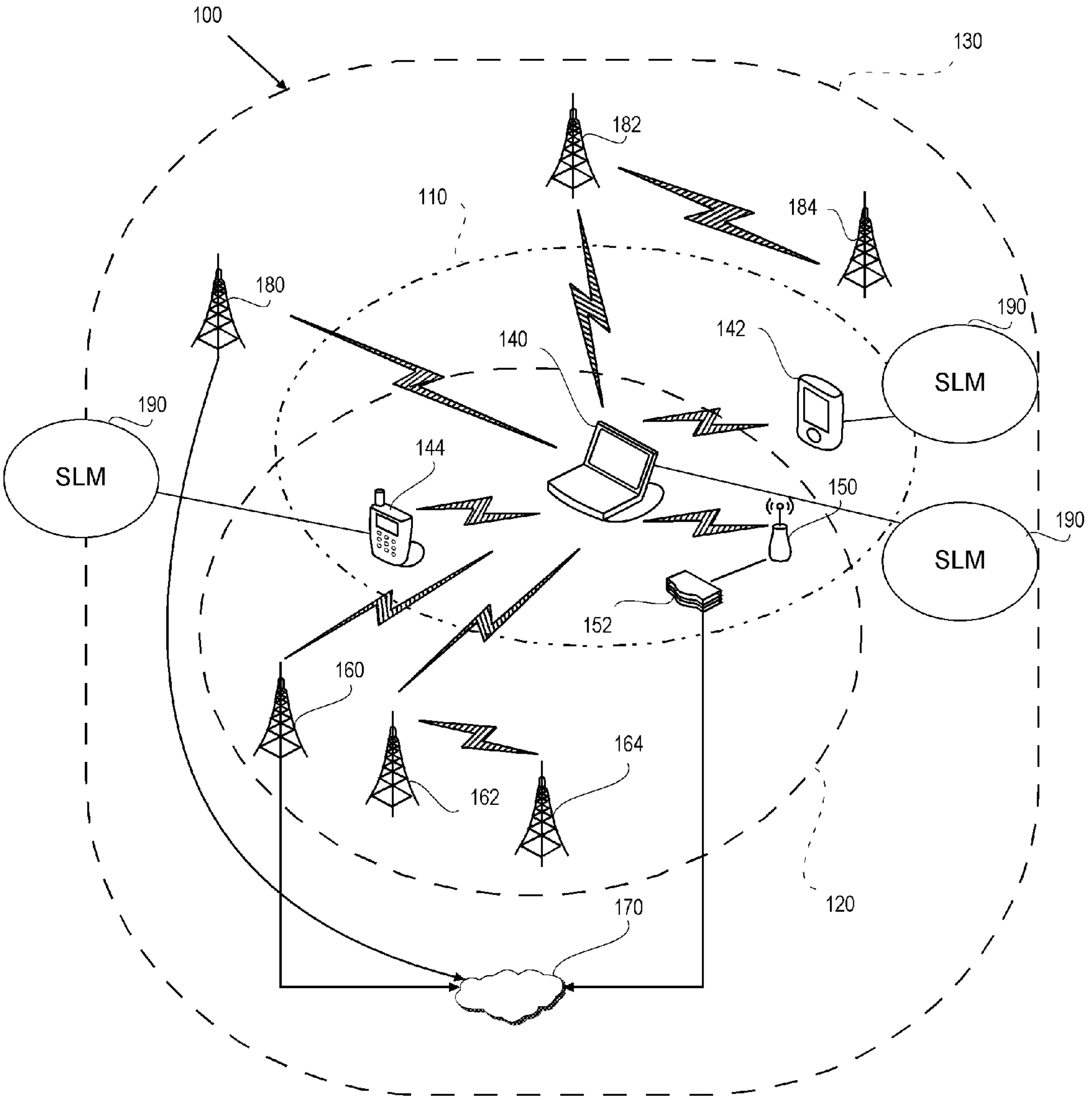
FIG. 1 schematically illustrates an example wireless communication system, in accordance with various embodiments.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

In the following description, algorithms and/or symbolic representations of operations on data bits and/or binary digital signals stored within a computing system, such as within a computer and/or computing system memory may be presented. An algorithm is generally considered to be a self-consistent sequence of operations and/or similar processing leading to a desired result where the operations may involve physical manipulations of physical quantities that may take the form of electrical, magnetic and/or electromagnetic signals capable of being stored, transferred, combined, compared and/or otherwise manipulated. In various contexts such signals may be referred to as bits, data, values, elements, symbols, characters, terms, numbers, numerals, etc. Those skilled in the art will recognize, however, that such terms may be used to connote physical quantities. Hence, when terms such as “storing”, “processing”, “retrieving”, “calculating”, “determining” etc. are used in this description they may refer to the actions of a computing platform, such as a computer or a similar electronic computing device such as a cellular telephone, that manipulates and/or transforms data represented as physical quantities including electronic and/or magnetic quantities within the computing platform’s processors, memories, registers, etc.

This disclosure is drawn, inter alia, to methods, apparatus, and systems related to measurement based wireless device system level management.

Embodiments of the present disclosure include a system of measurement techniques and experiment organization to model wireless device characteristics based, at least in part, on user defined quality of service and other needs. In various embodiments, the measurements may be conducted independently or in response to interacting users, tasks, hardware and software, and environment characteristics and models. Measurements used to characterize a user may include GPS or otherwise obtained location data of the wireless device, data from one or more body sensor networks, speed of typing, and/or the selection of recently invoked tasks, to name several examples. Task measurements may include, for example, characterization of current and/or recent communications including task invocation, processing, storage, and use of peripheral devices. Hardware measurements may include, for example, temperature, aging, and reliability evaluation of the device. Environmental measurements may include, for example, the quality of wireless communication links in terms of reception rate, variability, soft (radiation) error rate, and ambient temperature and humidity. In various embodiments, the measurements may be employed to determine parameters for system features of a wireless device, such as basic time unit for processor allocation, supply voltage, and the cache replacement strategy, sampling times for sensors, and what packet size, error correction code, modulation, or frequency range that may be used. In various embodiments, measurements may be used for system-level management (SLM) decisions that may guide operating system management decisions and operation. Embodiments may employ optimization techniques to determine set-up of operational parameters and may include techniques for the operating system to facilitate quality of service. System optimization may be conducted using, for example, clustering and/or classification statistical techniques, or variants of maximum likelihood, or engineering change.

FIG. 1 schematically illustrates an example wireless communication system, in accordance with various embodiments of the present disclosure. Wireless communication system 100 may include one or more wireless communication networks, generally shown as 110, 120 and 130. In particular, the wireless communication system 100 may include a wireless local area network (WLAN) 110, a wireless metropolitan area network (WMAN) 120 and a wireless wide area network (WWAN) 130. Although FIG. 1 depicts three wireless communication networks, the wireless communication system 100 may include additional or fewer wireless communication networks. For example, the wireless communication network 100 may include more or less WLANs, WMANs and/or WWANs. The methods and apparatus described herein are not limited in this regard.

The wireless communication system 100 may also include one or more mobile stations, also referred to as subscriber stations, generally shown as 140, 142 and 144. For example, the subscriber stations 140, 142 and 144 may include wireless electronic devices such as a desktop computer, a laptop computer, a handheld computer, a tablet computer (e.g., personal digital assistant (PDA)), a cellular telephone, a pager, an audio and/or video player (e.g., an MP3 player or a DVD player), a gaming device, a video camera, a digital camera, a navigation device (e.g., a global positioning satellite (GPS) device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic devices. Although FIG. 1 depicts three subscriber stations, the wireless communication system 100 may include more or less subscriber stations.

Subscriber stations 140, 142 and 144 may include a number of hardware and software resources and an operating system. Example of the hardware and software resources may include processor cycles, memory space, storage, networking bandwidth, applications and so forth. The operating system may be configured to manage the resources, including allocating the resources for various tasks performed on the wireless device. For various resources, the operating system may manage their use and allocation via various policies and/or parameters, for example, processor cycle time, memory space sizes, cache sizes, networking protocols and so forth.

The subscriber stations 140, 142 and 144 may use a variety of access schemes such as, for example, orthogonal frequency-division multiple access (OFDMA), spread spectrum schemes (e.g., direct sequence code division multiple access (DS-CDMA) and/or frequency hopping code division multiple access (FH-CDMA)), time-division multiple access (TDMA), frequency-division multiplexing access (FDMA) and/or other suitable access schemes to communicate via wireless links.

In some examples, the subscriber stations may use a direct sequence spread spectrum (DSSS) scheme and/or frequency hopping spread spectrum (FHSS) scheme to implement the WLAN 110 (e.g., modulations in accordance with any one of the 802.11 family of standards developed by the Institute of Electrical and Electronic Engineers (IEEE) and/or variations and evolutions of these standards). For example, the laptop computer 140 may communicate with devices associated with the WLAN 110 such as the handheld computer 142 and/or the cellular phone 144 via wireless links. The laptop computer 140 may also communicate with an access point (AP) 150 via a wireless link. Generally, WLANs and WMANs include one or more APs 150. The AP 150 may be operatively coupled to a router 152 as described in further detail below. Alternatively, the AP 150 and the router 152 may be integrated into a single device (e.g., a wireless router).

The subscriber stations may use OFDMA to transmit large amounts of digital data by splitting a radio frequency signal into multiple small sub-signals, which in turn, may be transmitted simultaneously at different frequencies. In particular, the subscriber stations may use OFDMA to implement the WMAN 120. For example, the subscriber stations may operate in accordance with the 802.16 family of standards developed by IEEE to provide for fixed, portable, and/or mobile broadband wireless access (BWA) networks (e.g., the IEEE std. 802.16, published by IEEE 2004) to communicate with base stations, generally shown as 160, 162, and 164, via wireless link(s).

Although some of the above examples are described with respect to standards developed by IEEE, the methods and apparatus disclosed herein are readily applicable to many specifications and/or standards developed by other special interest groups and/or standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP, 3GPP2), etc.). For example, long term evolution (LTE, a 3GPP standard), air interface evolution (a 3GPP2 standard) may be suitable standards for applicability with regard to various embodiments of the present disclosure in addition to IEEE 802.16 and WiMAX standards. The methods and apparatus described herein are not limited in this regard. Additionally, the subscriber stations may operate in accordance with other wireless communication protocols to support the WWAN 130. In particular, these wireless communication protocols may be based on analog, digital, and/or dual-mode communication system technologies such as, for example, Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, standards based on these technologies, variations and evolutions of these standards, and/or other suitable wireless communication standards.

The WLAN 110, WMAN 120 and WWAN 130 may be operatively coupled to a common public or private network 170 such as the Internet, a telephone network (e.g., public switched telephone network (PSTN)), a local area network (LAN), a cable network, and/or another wireless network via connection to an Ethernet, a digital subscriber line (DSL), a telephone line, a coaxial cable, and/or any wireless connection, etc. In one example, the WLAN 110 may be operatively coupled to the common public or private network 170 via an AP 150 and/or the router 152. In another example, the WMAN 120 may be operatively coupled to the common public or private network 170 via the base station(s) 160, 162, and/or 164. In another example, the WWAN 130 may be operatively coupled to the common public or private network 170 via base station(s) 180, 182 and/or 184.

The wireless communication system 100 may include other WLAN, WMAN, and/or WWAN devices (not shown) such as network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. Although certain examples have been described above, the scope of coverage of this disclosure is not limited thereto.

The efficient operation of wireless electronic devices within a system such as system 100 is becoming increasingly difficulty due to complex interaction of hardware, software, applications, operational and environmental conditions. Almost all of these entities have numerous options that greatly impact the effective use of a wireless device. For example, high temperature may double or triple energy consumption, and high energy consumption may rapidly additionally increase the temperature of a wireless device. However, the energy consumption may be impacted by many other issues, including the allocated time for the task, cache line policy, used scheduled algorithm, the quality of communication links, and/or used bandwidth. Thus, in accordance with various embodiments of the present disclosure, a system level manager (SLM) 190 may be provided to each of the portable electronic wireless devices 140, 142, and 144 (hereinafter, simply wireless devices). Each SLM 190 may be configured to receive a desired quality of service for of a wireless device to be managed. Each SLM 190 may also be configured to receive various performance models to model the device performance for various performance factors under various performance parameter settings. In particular, each SLM 190 may be configured to determine a number of metrics for obtaining measurements, in view of the desired quality of service and the performance models. On obtaining the measurements, each SLM 190 may be configured to determine one or more management actions to be taken by the operating system to manage the wireless device, and to meet the quality of service needs of the wireless device. In various embodiments, the management action may be determined through optimization of a quality of service objective function, where the performance of the wireless device may be estimated using the models, based at least in part on the obtained measurements. On the determination, each SLM 190 may convey to the operating system the management action to be taken. The process may be repeated periodically, or performed continuously by SLM 190, to allow the performance of the wireless device to be managed periodically or continuously to achieve a desired quality of service.

In accordance with various embodiments, an SLM 190 may be generic for one type of wireless device (e.g. a particular type of cell phone or a particular type and/or configuration of a laptop computer), or may target a specific device due to software customization or due to hardware factors such as manufacturing variability and aging of device components. It may also target devices that allocate their resources using standard or real-time operating systems.

In alternate embodiments, some or all aspects of SLM 190 may be integrated with the operating system of that wireless device. In still other embodiments, SLM 190 may be disposed on a remote computing device (not shown) instead. The remotely disposed SLM 190 may remotely manage one or more wireless devices in the network.

In various embodiments, the operating system of electronic wireless devices 140, 142, and 144 may be configured to provide measurements for various task, hardware and/or software related metrics, such as processor cycle time, cache hit, packet error rate and so forth. In various embodiments, electronic wireless devices 140, 142, and 144 may be configured with sensors to measure and to provide measurements for various user and/or device related metrics, e.g., temperature sensors for sensing temperature of the user and/or the wireless device, user bio-metric sensors for sensing one or more bio-metrics of the user, and so forth. In various embodiments, communication system 100 may be configured with sensors to measure and/or repositories to store, and to provide measurements for various environment related metrics, such as ambient temperature and/or humidity, network traffic bandwidth and/or error rates. In various embodiments, sensors or data collection units may be configured to take real time measurements, and/or take measurements continuously or periodically. SLM 190 may utilize these device and/or system capabilities in obtaining the measurements.

Figure 2:
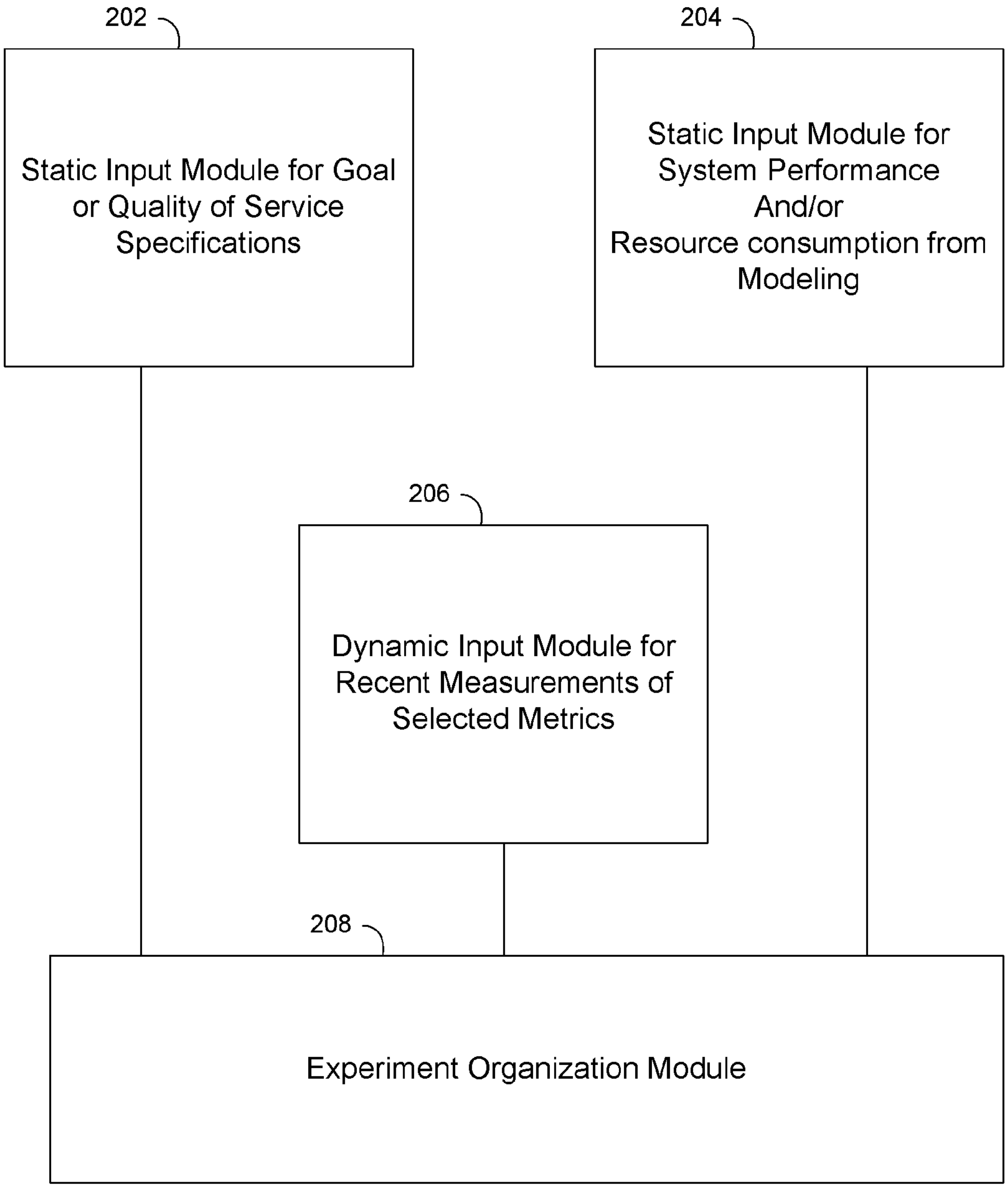
FIG. 2 schematically illustrates system level management (SLM) using measurements, in accordance with various embodiments.

FIG. 2 schematically illustrates system level management (SLM) using measurements, in accordance with various embodiments of the present disclosure. As illustrated, the embodiments may include two static input modules 202, 204, one dynamic input module 206 and an experiment organization module 208. The static input modules 202, 204 may include a static module 202 for inputting device goals or quality of service specifications, and another static module 204 for inputting system performance and resource consumption from modeling.

The first static input module 202 may be configured to interact with a user, or an operating system to receive and/or select a number of operation goals or quality of service (QoS) needs for the wireless device to be managed. In alternate embodiments, first static input module 202 may use a default list of operation goals or quality of service needs for the wireless device to be managed. Some operational goals or quality of service (QoS) needs may include, for example, energy consumption, length and/or severity of communication interference, error norms imposed over transmitted or computed data, maximal power usage, operational temperature, latency, throughput, bandwidth usage, or a subjective user satisfaction need.

Static input module 204 for inputting system performance and resource consumption via modeling may be configured with various models to provide information to the experiment organization module 208 regarding the expected performance of a specific resource when the specific resource may be allocated for each goal or service level of interest. The models may be heuristics pr parametric statistical. For example, module 204 may include a system performance or resource consumption model that describes dependency between the number of operations per second and/or consumed energy for a general purpose or digital signal processor.

Information provided by modules 202 and 204 may be used by experiment organization module 208 to select entities or metrics that may be measured to facilitate determination of management actions to enable the wireless device to better meet the device goals or quality of service needs. In various embodiments, the measurements may be conducted independently or in response to interacting users, tasks, hardware and software, and environment characteristics and models. Measurements associated with a user may include, for example, GPS or otherwise obtained location data, data from body sensor network, speed of typing, and the selection of recently invoked tasks. Task measurements may include, for example, characterization of current and recent communication, including task invocation, processing, storage, and use of peripheral devices. Hardware measurements may include, for example, temperature, aging, and reliability evaluation of the device. Environmental measurements may relate to, for example, the quality of wireless communication links in terms of features such as reception rate, variability, soft (radiation) error rate, and ambient temperature and humidity.

As a further example, if one or more of the goals or quality of service needs are associated with processor performance, and/or a processor's temperature, then circuit switching and leakage power, branch predictor performance, utilization, and so forth may be relevant factors for predicting professor performance, and experiment organization module 208 may accordingly obtain measurements for one or more of these factors.

The experiment organization module 208 may be configured to determine whether the measurements are to be obtained continuously or periodically. For example, dependent on the quality of service needs, more continuous or periodic measurements may be obtained if a higher quality of service level is desired. In various embodiments, the experiment organization 208 may be provided with a list of sensors to cause the desire measurements to be taken, and/or may be provided a list of measurements repositories from which the desire measurements may be stored, and/or available for retrieval.

The dynamic input module 206 may be configured to provide recent measurements of a subset of the relevant metrics to the experiment organization module 208. In response, the experiment organization module 208 may adapt the metrics for which the module seeks to obtain measurements and/or may modify the manner and/or frequency of which measurements are to be taken. For example, the earlier mentioned measurements of leakage voltage and so forth may be initiated, or the manner and frequency of their measurements may be modified, if recent measurements of the temperature of a device's general purpose processor indicate relatively high temperature.

Accordingly, experiment organization module 208 may select one or more factors that may be experimentally observed as most important, and based on their relative significance, may select the manner and frequency of observation. Experiment organization module 208 may consider the cost of an experiment to obtain measurement for a metric, and/or the potential benefit from having the measurement, when determining whether to select a metric and organize an experiment to obtain measurements for the metric.

In various embodiments, experiment organization module 208 may be further configured to determine one or more management actions to be performed by the operating system, based at least in part on the measurements obtained. In various embodiments, the management actions may include, for example, the operating system adjusting one or more its operating parameters and/or policies. Examples of operating parameters and/or policies include, but are not limited to, basic time unit(s) for processor allocation, a needed supply voltage, a cache replacement strategy, a sampling time for a sensor, a packet size for communication, an error correction code for error correction, a modulation technique for communication, and/or a frequency range for communication, associated with the wireless device.

In various embodiments, experiment organization module 208 may determine management actions by optimizing an objective function associated with the quality of service needs, by using, for example, a clustering or a classification statistical technique, or a variant of maximum likelihood technique, wherein impact on quality of service may be estimated using the performance models. In various embodiments, experiment organization module 208 may determine the management actions based on a current or anticipated state of operation of the portable electronic device.

Figure 3:
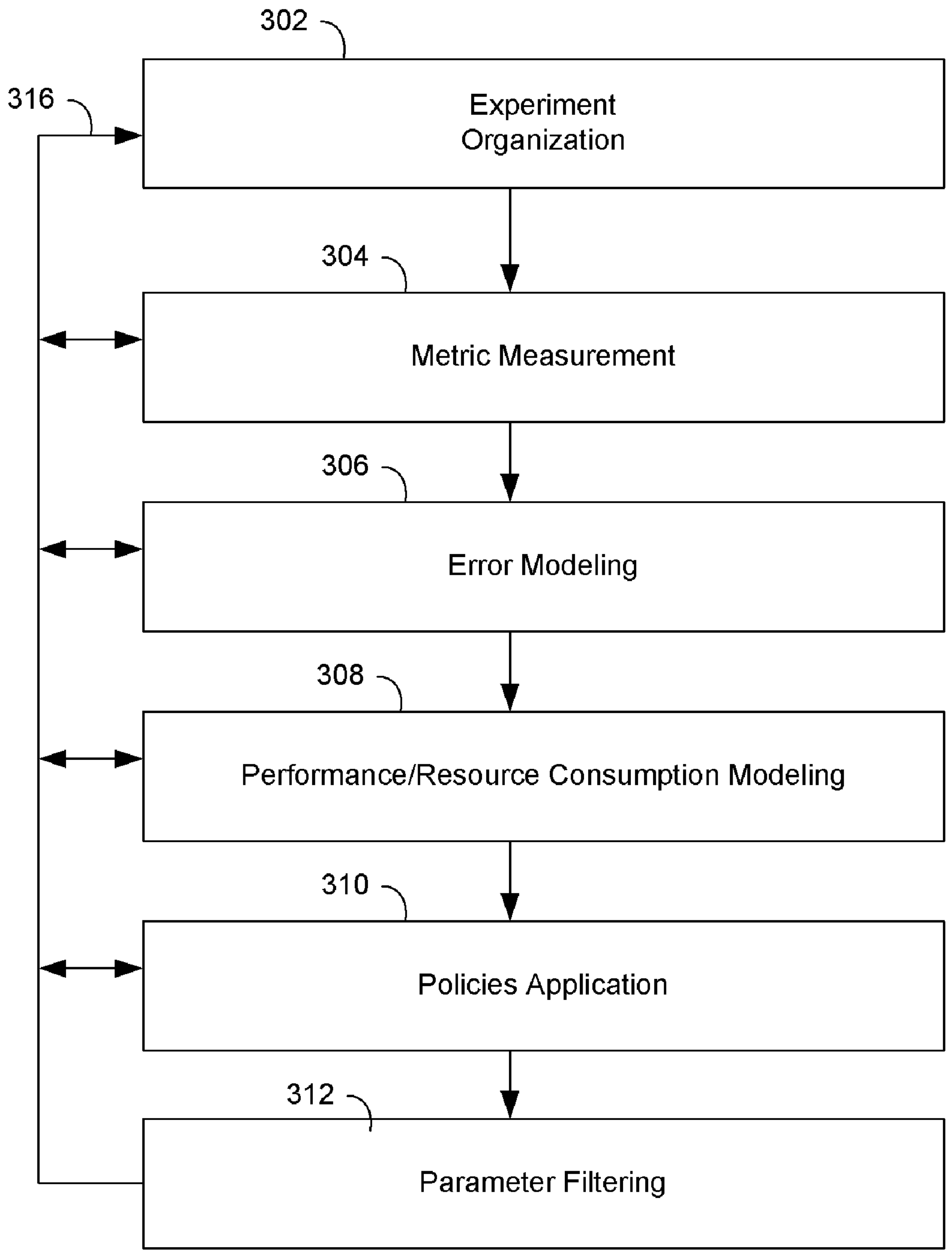
FIG. 3 is a flow chart illustrating an example of operational flow of SLM using measurements, in accordance with various embodiments.

FIG. 3 is a flow chart illustrating an example of operational flow of SLM using measurements, in accordance with various embodiments of the present disclosure. Processes of FIG. 3 and other processes described herein, set forth various functional blocks that may be described as processing steps, functional operations, events and/or acts, etc., and that may be performed by hardware, software or any combination thereof. Those skilled in the art in light of the present disclosure will recognize that numerous alternatives to the functional blocks shown in FIG. 3 may be practiced in various implementations. As illustrated, in various embodiments, SLM using measurements may include experiment organization 302, metric measurements 304, error modeling 306, performance and/or resource consumption modeling 308, policies application 310 and parameter filtering 312.

As described earlier, during experiment organization 302, goals or quality of service needs, and system performance or resource consumption models for a wireless device may be gathered. The goals and/or quality of service needs may be provided by a user, by the operating system of the wireless device to be managed, or may be provided in the form of default goals/needs. The performance and/or resource consumption models may be provided by the component manufacturers and/or system integrators. Then, based on the gathered goals or quality of service needs, and performance/resource consumption models, a determination may be made on the metrics for which measurements are to be obtained.

During metric measurement 304, measurements of the determined relevant metrics may be obtained, which may include real time data collecting for the relevant metrics. Collection of data as described earlier may be performed continuously or periodically.

During error modeling 306, adjustments or error correction may be performed on the obtained measurements for the determined metrics, based on one or more error models that model measurement errors. In some implementations, the models may be heuristic, parametric statistical, or data driven. During performance/resource consumption modeling 308, performance and/or resource consumption of the wireless device may be modeled based on the most recent measurements obtained for the relevant metrics.

During policies application 310, various system management policies may be applied in determining the management action, if any, that may be performed to enable the wireless device to meet its performance goals or quality of service needs. In some implementations, block 310 may be undertaken by a device's operating system. During parameter filtering 312, if the management actions involved one or more operational parameters of the wireless device, a parameter filtering operation may be performed to coordinate the modifications to be made to the operating parameters.

In accordance with various embodiments, only operations 304 (for a default set of metrics) and 312 may be initially performed. Other operations, operations 302, 306, 308, and 310 may be optionally performed subsequently on a desirable basis. As illustrated, while the flow 300 may be from experiment organization 302 to parameter filtering 312, a feedback arc 316 is illustrated indicating that the process may loop back from any of the "lower ordered" operations to any "higher ordered" operations. The "order" of these operations is for illustrative and ease of understanding only, and they are not meant to be restrictive on the present disclosure.

As an example, in various embodiments, SLM with measurement may start with an performance goal or quality of service need, and a number of probability density functions (PDFs) of the setting of the relevant operational parameters of a wireless device may be determined. Examples of operational parameters for an energy optimization objective of a processor may include one or more of: (i) supply voltage; (ii) an allocated dedicated cache; (iii) the allocated percentage of cycles on the processor; and (iv) the number of bits that are not powered down using gating. For this example, it is assumed that it is desirable for minimal energy to be spent for a given throughput and constraints on the maximal output error. In accordance with various embodiments, the selected parameters may be evaluated in decreasing order of the likelihood that they form the best solution. The likelihood may be calculated as a product of individual probabilities.

As an example, in accordance with various embodiments, the process may be initiated and performed at a point in time when a new task request execution for a wireless device may be received by the wireless device. SLM 190 in cooperation with the operating system of the wireless device may create a system level agreement (SLA) that allocates needed resources of the wireless device to the task. The SLM 190 then may cause various measurements of relevant metrics associated with the wireless device to be obtained during performance of the tasks. The SLM 190 may, from time to time, review the SLA specifically, or in conjunction with other SLAs. The SLM 190 may determine one or more management actions to be performed by the operating system to enable the wireless device to conform with the SLA(s). For each task, the SLM 190 may instruct or suggest the operating system to alter allocation of resources in accordance with available resource consumption models and measurements most likely to benefit most the targeted objective. The management action may further include suggesting the operating system to alter one or more of the SLAs it has entered, in such a way that various optimization goals may be improved.

Figure 4:
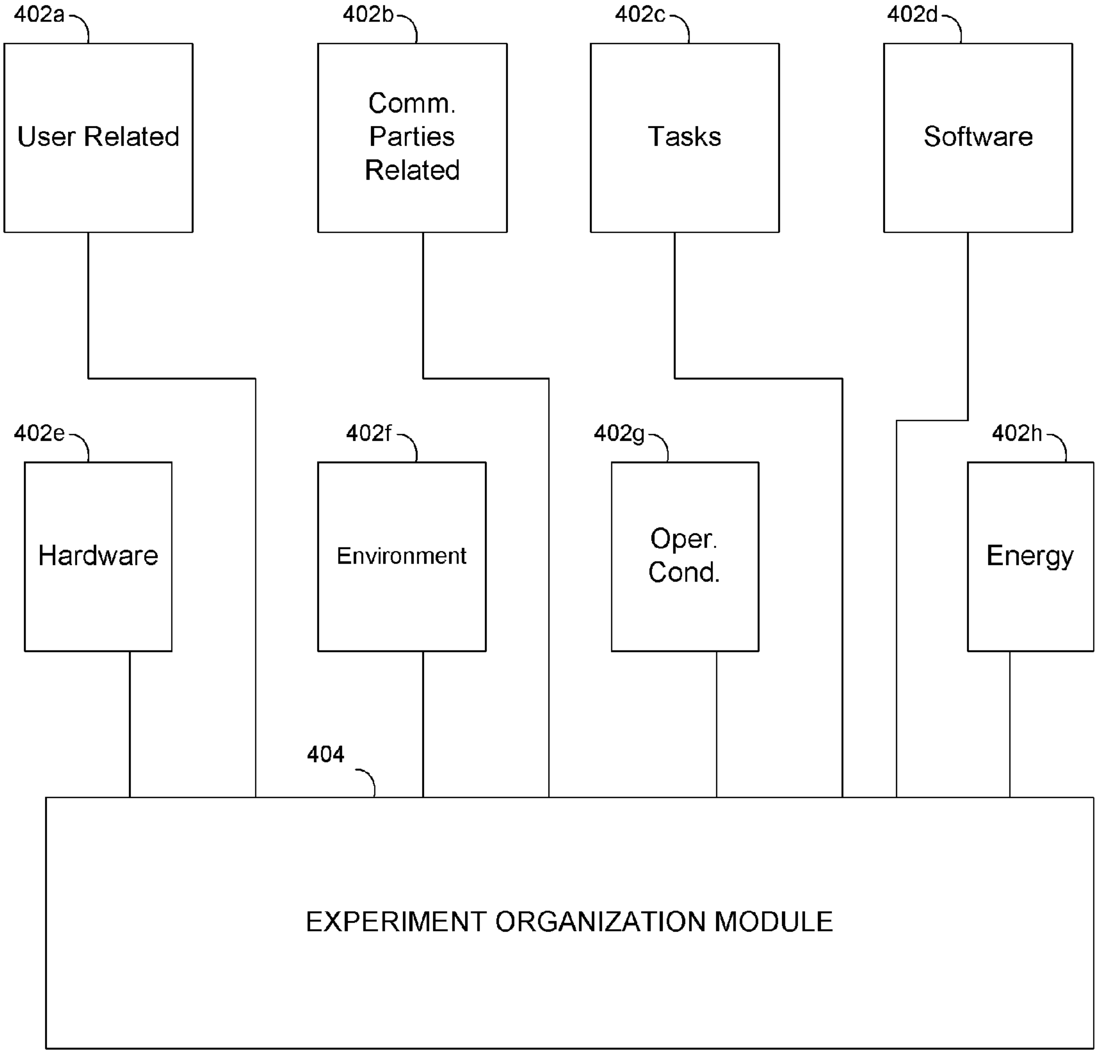
FIG. 4 schematically illustrates an example of experiment organization technique for use in obtaining measurements of metrics, in accordance with various embodiments.

FIG. 4 schematically illustrates an example of experiment organization technique for use in obtaining measurement of metrics, in accordance with various embodiments. For the embodiments, experiment organization module 404 employs eight classes 402*a-h* of measured entities or relevant families of metrics: 402*a* user related; 402*b* communication parties related; 402*c* tasks; 402*d* software; 402*e* hardware; 402*f* environment; 402*g* operational conditions; and 402*h* energy related. In accordance with various embodiments, measurements of each family of metrics (when determined to be obtained) may be selectively activated using experiment organization module 204.

The relevant user related metrics may include, for example, Global Positioning System (GPS) or otherwise obtained location data, bio metric data from body sensor network, and/or speed of the user's typing. The relevant communication parties related metrics may include, for example, identities of the parties, frequency of the communications, duration of the communications, forms of the communications, voice, short messaging service, and/or email.

The relevant task and software metrics may include, for example, the selection of recently invoked tasks, the applications involved, the types of data involved, textual, audio and/or multi-media. The relevant hardware and operational conditions metrics may include, for example, processing, storage, use of peripheral devices temperature, aging, and/or reliability evaluation of the device. The relevant environment and energy related metrics may include, for example, the quality of wireless communication links in terms of features such as reception rate, variability, soft (radiation) error rate, and/or environment temperature and humidity.

In alternate embodiments, the present disclosure may be practiced with other organizations of the metrics. As described earlier, experiment organization module 404 may control the frequency and conditions under which the measurements are taken. Experiment organization module 404 may cause calibration to be performed prior to the taking of measurements. Experiment organization module 404 may subject the measurements taken to post collection error correction through, for example, error modeling.

In various embodiments, experiment organization module 404 may organize the experiments to be performed to obtain measurement of the relevant metrics in accordance with statistical schemes for experiment organization. In various embodiments, the statistical schemes for experiment organization include a Plackett-Burman procedure.

Figure 5:
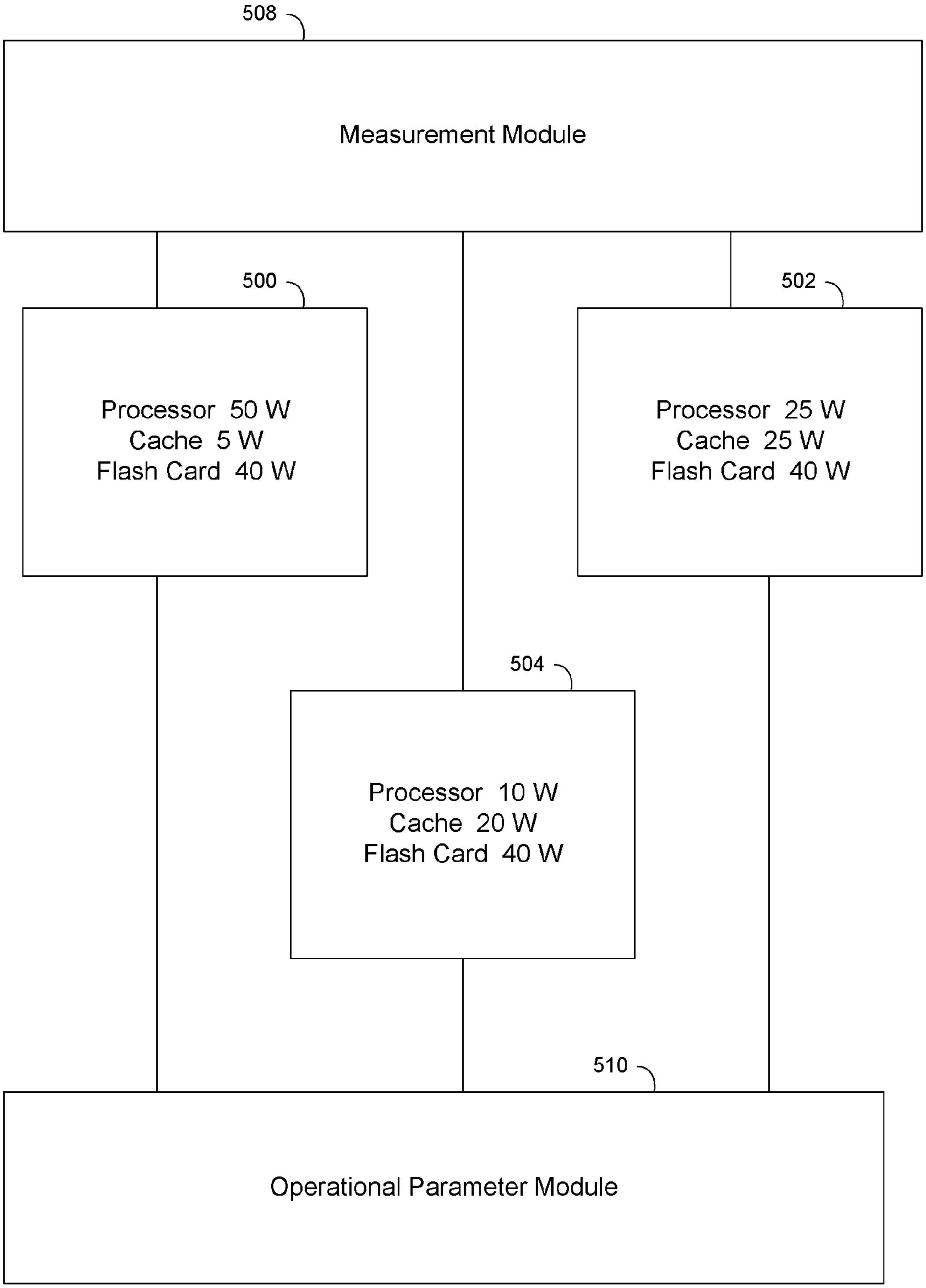
FIG. 5 schematically illustrates customization of unique wireless devices, in accordance with various embodiments.

FIG. 5 schematically illustrates customization of unique wireless devices, in accordance with various embodiments of the present disclosure. Due to a variety of technological, operational, and environmental factors such as, for example, manufacturing variability, the wireless devices, 500, 502 and 504 may have different characteristics even though they may be the same model and/or design. Therefore, even when wireless devices of the same type observe identical measurements, corresponding performance and resource models may be different. Hence, the SLM of each of device may select different parameter settings and select different protocols, algorithms, and policies. For example, FIG. 5 illustrates devices having different component power consumption. For example, device 500 has a processor that consumes 50 W, cache that consumes 5 W, and a flash card that consumes 40 W. Device 502 has a processor that consumes 25 W, cache that consumes 25 W, and a flash card that consumes 40 W. Finally, device 504 has a processor that consumes 10 W, cache that consumes 20 W, and a flash card that consumes 40 W. The SLM of each device 502, 504, 506 may therefore organize different measurements via measurement module 508 and set operational parameters via operational parameters module 510 in different ways. For example, device 500 may measure operational parameters that most impact the processor, device 502 may measure operational parameters that most impact cache, and device 504 may measure operational parameters that most impact flash. Specifically, each of device's 500-504 may measure temperature of the most energy demanding component and corresponding environment and software factors. Thus, each system may select operational parameters that are most beneficial for its energy model. For example, device 504 may utilize a highly efficient processor to operate in the presence of low reception rates, while two other devices may try to benefit from low energy storage models by storing complex predictors that decide when and how to process a particular packet of information, may use correspondingly longer packets etc.

Figure 6:
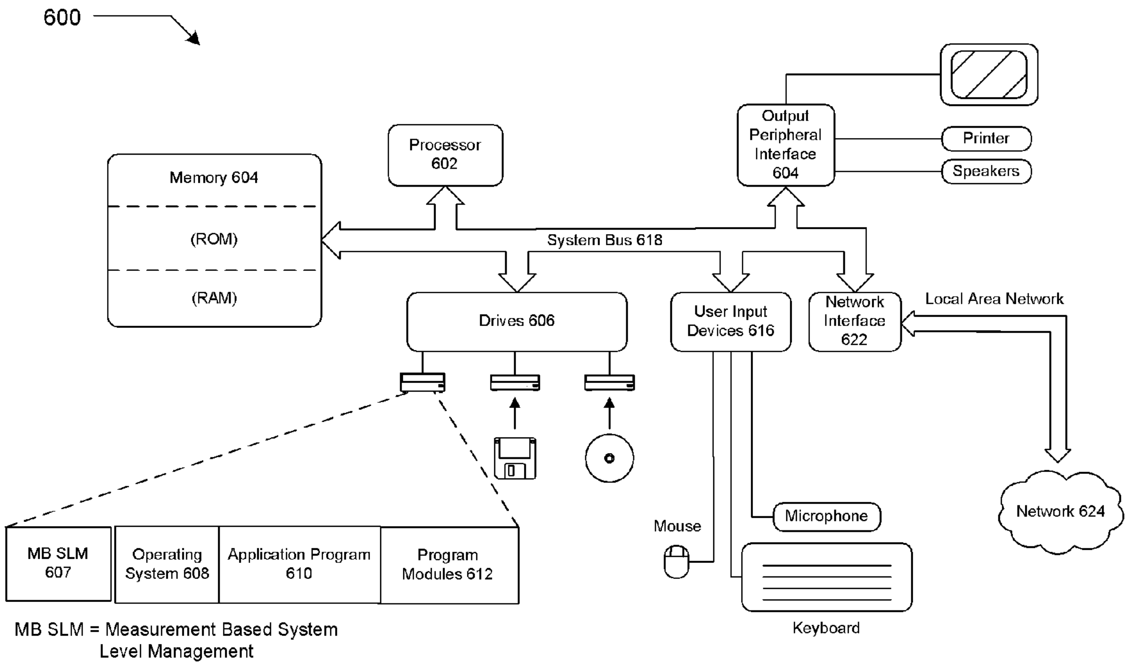
FIG. 6 illustrates an example computing device suitable for practicing aspects of SLM using measurements, in accordance with various embodiments.

FIG. 6 illustrates an example computing device 600 suitable for practicing aspects of SLM using measurements, in accordance with various embodiments of the present disclosure. Computing device 600 includes processor 602, memory 604 and one or more drives 606. The drives 606 and their associated computer storage media, may provide storage of computer readable instructions, data structures, program modules and other data for the computer device 600. The drives 606 may include an operating system 608, application programs 610 and program modules 612. In accordance with the present disclosure, drives 606 may further include programming instructions 607 implementing various earlier described aspects of SLM using measurements.

The computer device 600 may further include user input devices 616 through which a user may enter commands and data. Input devices may include an electronic digitizer, a microphone, a keyboard and pointing device, such as a mouse, trackball or touch pad. Other input devices may include a joystick, game pad, satellite dish, scanner, or the like.

These and other input devices may be coupled to processor 602 through a user input interface that may be coupled to a system bus 618, but may be coupled by other interface and bus structures, such as a parallel port, game port or a universal serial bus (USB). Computers such as the computer device 600 may also include other peripheral output devices such as speakers, which may be coupled through an output peripheral interface 620 or the like.

The computer device 600 may operate in a networked environment using logical connections to one or more computers, such as a remote computer coupled to network interface 622. The remote computer may be a personal computer, a server, a router, a network PC, a peer device or other common network node, and may include many or all of the elements described above relative to the computer device 600. Networking environments may include enterprise-wide area networks (WAN), local area networks (LAN), intranets and the Internet. For example, in accordance with the present disclosure, computer device 600 may be a source machine from which data may be migrated, and the remote computer may be a destination machine or vice versa. Note however, that source and destination machines need not be coupled by a network 624 or any other means, but instead, data may be migrated via any media capable of being written by the source platform and read by the destination platform or platforms. When used in a LAN or WLAN networking environment, the computer device 600 may be coupled to the LAN through a network interface 622 or an adapter. When used in a WAN networking environment, computer device 600 may include a modem or other means for establishing communications over the WAN, such as the Internet or network 624. It will be appreciated that other means of establishing a communications link between the computers may be used.

Articles of manufacture and/or systems may be employed to perform one or more processes as disclosed herein. FIG. 7 illustrates an example article of manufacture having a computer program product 700 for system level management using measurement in accordance with various embodiments of the present disclosure. The computer program product 700 may include computer readable storage medium 732 and a number of programming instructions 734 stored in the storage medium 732. In various ones of these embodiments, programming instructions 734 may be adapted to program an apparatus to enable the apparatus to perform one or more of receiving goals or quality of service needs of a wireless device, receiving performance models of the wireless device, determining relevant metrics to obtain measurements to manage the wireless device, determining management action, if any, to be performed by an operating system of the wireless device to better meet the performance objective or quality of service needs of the wireless device, and/or conveying the determined management actions, if any, to the operating system of the wireless device.

Storage medium 732 may take a variety of forms including, but not limited to, non-volatile and persistent memory, such as, but not limited to, compact disc read-only memory (CDROM) and flash memory.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a storage medium or storage media. This storage media, such as CD-ROMs, computer disks, flash memory, or the like, for example, may have instructions stored thereon, that, when executed by a system, such as a computer system, computing platform, or other system, for example, may result in execution of a processor in accordance with claimed subject matter, such as one of the implementations previously described, for example. As one possibility, a computing platform may include one or more processing units or processors, one or more input/output devices, such as a display, a keyboard and/or a mouse, and one or more memories, such as static random access memory, dynamic random access memory, flash memory, and/or a hard drive.

Reference in the specification to “an implementation,” “one implementation,” “some implementations,” or “other implementations” may mean that a particular feature, structure, or characteristic described in connection with one or more implementations may be included in at least some implementations, but not necessarily in all implementations. The various appearances of “an implementation,” “one implementation,” or “some implementations” in the preceding description are not necessarily all referring to the same implementations. Moreover, when terms or phrases such as “coupled” or “responsive” or “in response to” or “in communication with”, etc. are used herein or in the claims that follow, these terms should be interpreted broadly. For example, the phrase “coupled to” may refer to being communicatively, electrically and/or operatively coupled as appropriate for the context in which the phrase is used.

In the preceding description, various aspects of claimed subject matter have been described. For purposes of explanation, specific numbers, systems and/or configurations were set forth to provide a thorough understanding of claimed subject matter. However, it should be apparent to one skilled in the art and having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now, or in the future, occur to those skilled in the art. It is, therefore, to be understood that the appended claims are intended to cover all such modifications and/or changes as fall within the true spirit of claimed subject matter.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method comprising:

determining, by a system level manager, a plurality of metrics to measure to manage a wireless device having resources and an operating system configured to manage the resources, wherein the determining is based at least in part on one or more quality of service needs and a plurality of performance models associated with the wireless device;

obtaining, by the system level manager, measurements for the plurality of determined metrics;

determining, by the system level manager, a management action to be taken by the operating system to manage the wireless device in response to the quality of service needs; and conveying the management action from the system level manager to the operating system.

2. The method of claim 1, further comprising the system level manager receiving the quality of service needs associated with the wireless device, wherein the quality of service needs comprise at least one of an energy consumption need, a length and/or severity of communication interference need, a used bandwidth need, a latency need, an error norms imposed over transmitted or computed data need, or a subjective user satisfaction need.

3. The method of claim 1, further comprising the system level manager receiving the performance models associated with the wireless device, wherein the performance models comprise a heuristic model or a parametric statistical model.

4. The method of claim 1, wherein the metrics comprise a user characteristic metric, an environment characteristic metric or a hardware characteristic metric associated with the wireless device.

5. The method of claim 4, wherein the user characteristic metric comprises a selected one of a Global Position System (GPS) or otherwise obtained location of the user, a bio metric of the user, an input speed of the user, or a recent task invocation history of the user.

6. The method of claim 5, wherein a recent task invocation history of the user comprises a current or recent communication, processing, storage, and use of peripheral devices associated with the wireless device.

7. The method of claim 4, wherein the hardware characteristic metric comprises a selected one of a temperature reading, an aging evaluation, or a reliability evaluation associated with the wireless device.

8. The method of claim 4, wherein the environment characteristic metric comprises a selected one of a communication reception rate, a communication variability metric, a soft radiation error rate, an ambient temperature reading or an ambient humidity reading associated with an operating environment of the wireless device.

9. The method of claim 1, wherein the obtaining comprises organizing and conducting a plurality of experiments to obtain the measurements.

10. The method of claim 9, wherein the experiments are organized in accordance with statistical schemes for experiment organization, wherein the statistical schemes include a Plackett-Burman procedure.

11. The method of claim 9, wherein organizing the experiments comprises considering cost and benefit contributions of a candidate experiment.

12. The method of claim 1, wherein the obtaining comprises the system level manager causing a sensor to take a measurement or retrieving a measurement for a metric, wherein the measurement comprises a measurement to be taken continuously or periodically or a measurement that was taken continuously or periodically.

13. The method of claim 1, wherein the management action to be performed by the operating system comprises adjusting an operating parameter of the wireless device, wherein the operating parameter comprises a selected one of a basic time unit for processor allocation, a required supply voltage, a cache replacement strategy, a sampling time for a sensor, a packet size for communication, an error correction code for error correction, a modulation technique for communication, or a frequency range for communication, associated with the wireless device.

14. The method of claim 1, wherein determining a management action comprising optimizing an objective function comprising the quality of service needs, using either a clustering or a classification statistical technique, or a variant of maximum likelihood technique, wherein estimating impact on quality of service comprises using the performance models.

15. The method of claim 1, wherein determining is further based on a current or anticipated state of operation of the wireless device.

16. The method of claim 1, wherein the wireless device comprises the system level manager, and the method further comprises the operating system performing the conveyed management action.

17. An apparatus for managing a wireless device based on measurements, the apparatus comprising:

a processor; and storage medium coupled to the processor and having a plurality of programming instructions stored therein, wherein the programming instructions are to be executed by the processor, and wherein when the programming instructions are executed by the processor, the programming instructions enable the apparatus to determine a plurality of metrics to measure to manage a wireless device having resources and an operating system configured to manage the resources, wherein the determine is based at least in part on a plurality of qualify of service needs and a plurality of performance models associated with the wireless device;

obtain measurements for the plurality of determined metrics;

determine a management action to be taken by the operating system to manage the wireless device to better achieve the quality of service needs; and convey the management action to be taken to the operating system of the wireless device.

18. The apparatus of claim 17, wherein when executed, the programming instructions further enable the apparatus to receive the quality of service needs associated with the wireless device, wherein the quality of service needs comprise at least one of an energy consumption need, a length and/or severity of communication interference need, a used bandwidth need, a latency need, an error norms imposed over transmitted or computed data need, or a subjective user satisfaction need.

19. The apparatus of claim 17, wherein when executed, the programming instructions further enable the apparatus to receive the performance models associated with the wireless device, wherein the performance models comprise a heuristic model or a parametric statistical.

20. The apparatus of claim 17, wherein the metrics comprise a user characteristic metric, an environment characteristic metric or a hardware characteristic metric associated with the wireless device.

21. The apparatus of claim 17, wherein when executed, the programming instructions enable the apparatus to organize and conduct a plurality of experiments to obtain the measurements.

22. The apparatus of claim 21, wherein when executed, the programming instructions enable the apparatus to organize in accordance with statistical schemes for experiment organization, wherein the statistical schemes include a Plackett-Burman procedure.

23. The apparatus of claim 21, wherein when executed, the programming instructions enable the apparatus to consider cost and benefit contributions of a candidate experiment.

24. The apparatus of claim 17, wherein when executed, the programming instructions further enable the apparatus to instruct a sensor of the wireless device to take a measurement or instruct a storage unit of the wireless device to store a taken measurement for a metric, wherein the measurement is to be taken continuously or periodically.

25. The apparatus of claim 17, wherein when executed, the programming instructions enable the apparatus to optimize an objective function comprising the quality of service needs, using either a clustering or a classification statistical technique, or a variant of maximum likelihood technique, wherein impact on quality of service is estimated using the performance models.

26. The apparatus of claim 17, wherein the apparatus comprises the wireless device.

27. An article of manufacture comprising:

a computer readable storage medium; and a plurality of programming instructions stored in the computer readable storage medium, wherein the programming instructions are configured to program a processor of an apparatus, and wherein when the programming instructions are executed by the process, the programming instructions enable the apparatus to:

receive a plurality of quality of service needs associated with a wireless device, the wireless device having resources and an operating system configured to manage the resources of the wireless device;

receive a plurality of performance models to model performance of the wireless device;

determine a plurality of metrics to measure to manage a wireless device, said determining based at least in part on the plurality of qualify of service needs and the plurality of performance models associated with the wireless device;

obtain measurements for the plurality of determined metrics;

determine a management action to be taken by the operating system; and convey the management action to be taken to the operating system of the wireless device.

28. The article of claim 27, wherein when executed, the programming instructions enable the apparatus to perform the obtaining, including organizing and conducting a plurality of experiments to obtain the measurements, wherein the experiments are organized in accordance with statistical schemes for experiment organization, wherein the statistical schemes include a Plackett-Burman procedure.

29. The article of claim 27, wherein when executed, the programming instructions enable the apparatus to determine a management action by optimizing an objective function comprising the quality of service needs, using either a clustering or a classification statistical technique, or a variant of maximum likelihood technique.

* * * * *

UNITED STATES PATENT AND TRADEMARK OFFICE

CERTIFICATE OF CORRECTION

PATENT NO. : 8,111,149 B2
APPLICATION NO. : 12/433696
DATED : February 7, 2012
INVENTOR(S) : Potkonjak It is certified that error appears in the above-identified patent and that said Letters Patent is hereby corrected as shown below:

On the Title Page, in Item (56), under "OTHER PUBLICATIONS", in Column 2, Line 13, delete "pages" and insert -- pages. --, therefor.

In the Specification:

In Column 9, Line 65, delete "devices" and insert -- devices, --, therefor.

In the Claims:

In Column 16, Line 12, in Claim 17, delete "qualify" and insert -- quality --, therefor.

In Column 17, Line 16, in Claim 27, delete "qualify" and insert -- quality --, therefor.

Signed and Sealed this
Eleventh Day of June, 2013

Teresa Stanek Rea
*Acting Director of the United States Patent and Trademark Office*